INVENTOR.
RALPH R. FOWLER

Nov. 11, 1947. R. R. FOWLER 2,430,810
APPARATUS FOR RECORDING THE FIRING SPEED OF RAPID FIRE GUNS
Filed May 29, 1942 3 Sheets-Sheet 2
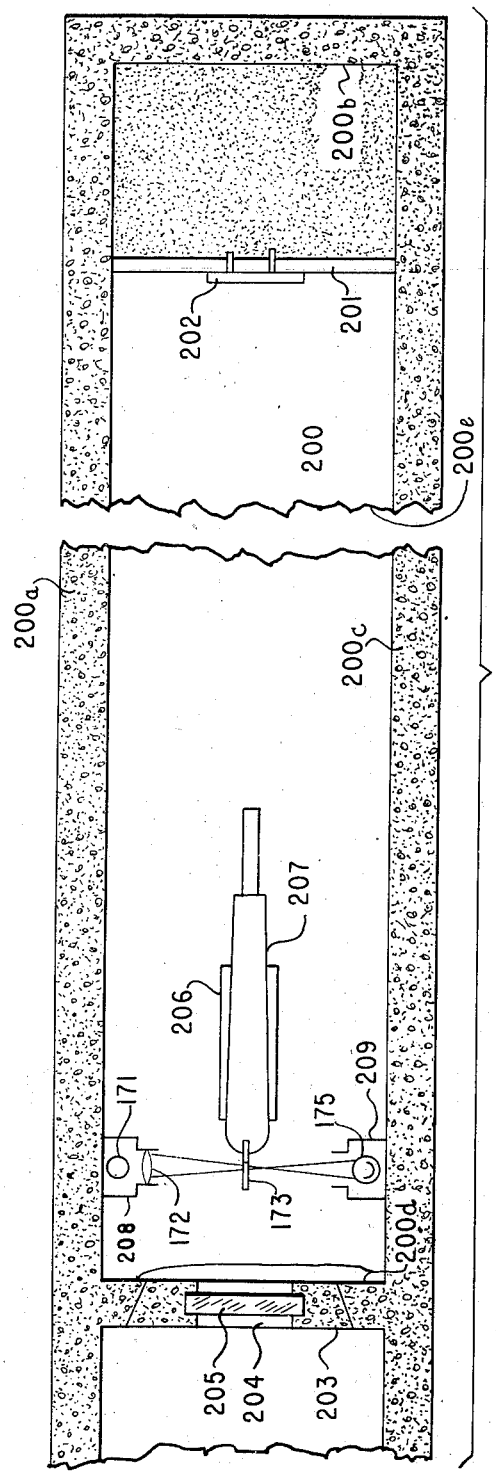
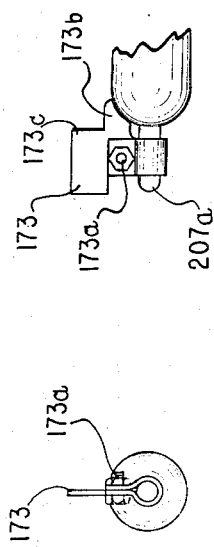
INVENTOR.
RALPH R. FOWLER
BY Davis, Lindsey, Smith & Shonts
ATTORNEYS Nov. 11, 1947.  R. R. FOWLER  2,430,810
APPARATUS FOR RECORDING THE FIRING SPEED OF RAPID FIRE GUNS
Filed May 29, 1942  3 Sheets-Sheet 3

INVENTOR.
RALPH R. FOWLER
BY Davis, Lindsey, Smith & Shonts
ATTORNEYS

Patented Nov. 11, 1947

2,430,810

UNITED STATES PATENT OFFICE 2,430,810

APPARATUS FOR RECORDING THE FIRING SPEED OF RAPID-FIRE GUNS

Ralph R. Fowler, Oak Park, Ill., assignor to Automatic Electric Laboratories, Inc., a corporation of Delaware Application May 29, 1942, Serial No. 444,994

9 Claims. (Cl. 234—1.5)

1

The present invention relates to apparatus for determining the performance of rapid fire guns or other ordnance pieces, and more particularly to improvements in apparatus for accurately determining the firing speed of automatic rapid fire guns which may be controlled to fire any desired number of shells in a given burst.

In the testing of manufactured ordnance pieces of the character described, one of the essential factors to be determined is the maximum firing speed of each piece. This factor is determined by observing the time interval required for a gun undergoing test to fire a burst comprising a given number of shells. Since, however, many rapid fire guns are designed to fire at speeds in excess of 600 shots per minute, it is difficult to count the shots of a given burst and also to obtain an accurate measurement of the time required for the burst. Moreover, the accuracy of counting the shots of a burst and of determining the elapsed time of the burst, directly determines the number of shells which must be fired in order to ascertain the firing speed with acceptable accuracy.

It is an object of the present invention, therefore, to provide, for determining the firing speed of a rapid fire gun, improved apparatus which is entirely automatic in operation and is sufficiently accurate in the indications produced thereby to permit the firing speed of the gun to be accurately determined by firing a burst comprising only a small number of shots.

According to another object of the invention, the apparatus is so arranged that only one simple attachment to a gun undergoing test is required in the production of the indications necessary to ascertain the firing speed of the gun.

In accordance with another object of the invention, the apparatus is arranged to produce the indications in permanent record form and provisions are made therein for simultaneously obtaining a plurality of original records of the firing speed of each gun tested.

Figure 1:
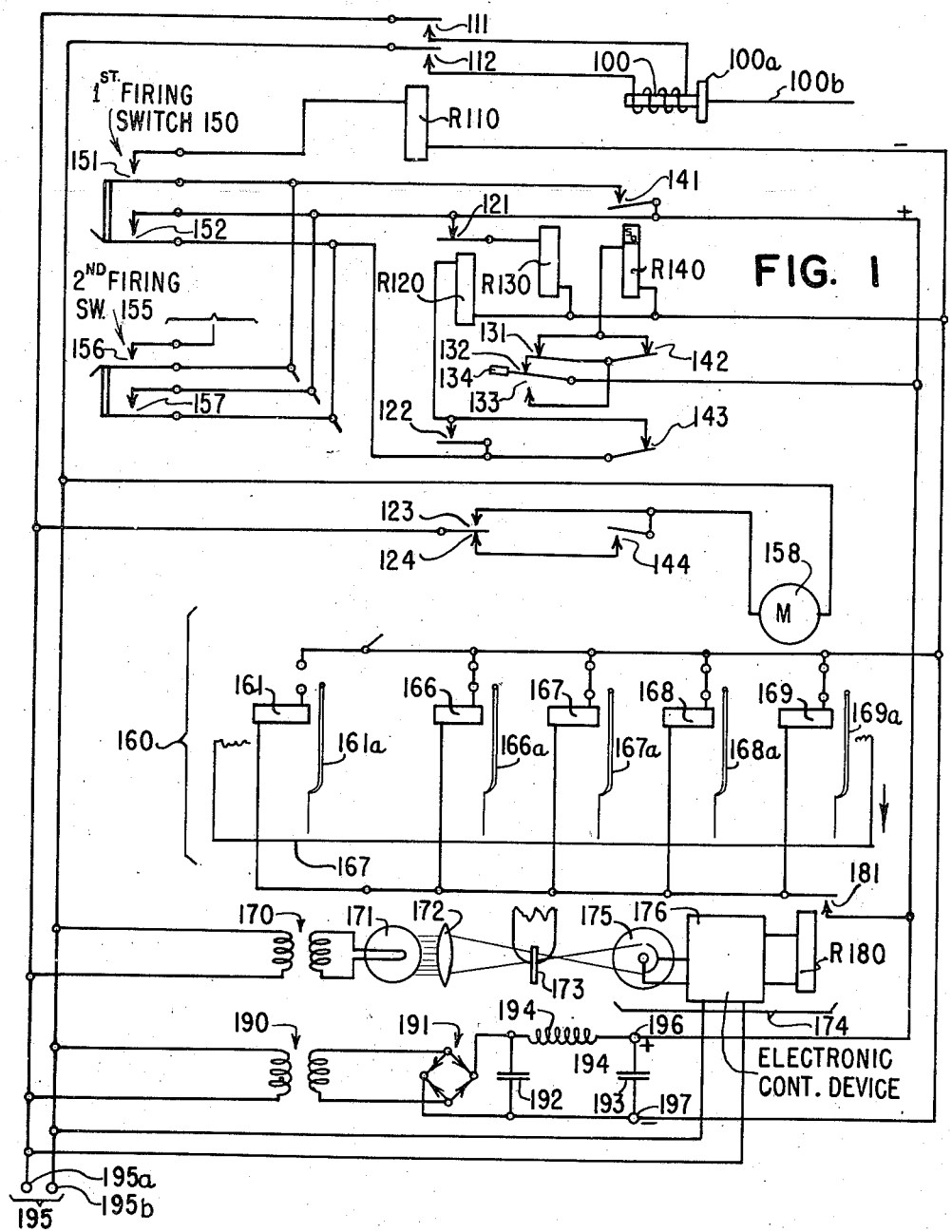

The invention, both as to its organization and method of operation, together with further objects and advantages thereof, will best be understood by reference to the specification taken in connection with the accompanying drawings in which Fig. 1 illustrates the circuit connections of improved apparatus characterized by the features of the present invention; Fig. 2 illustrates the construction of a gun testing pit which may be equipped with testing apparatus of the character shown in Fig. 1; Figs. 3 and 4 are end and side views respectively of a part which is attached to

Figure 5:
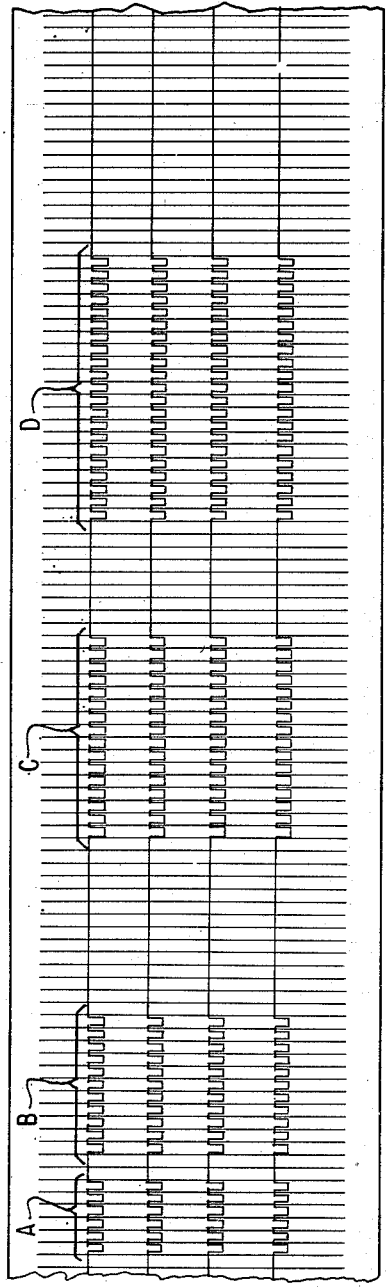
Figure 6:
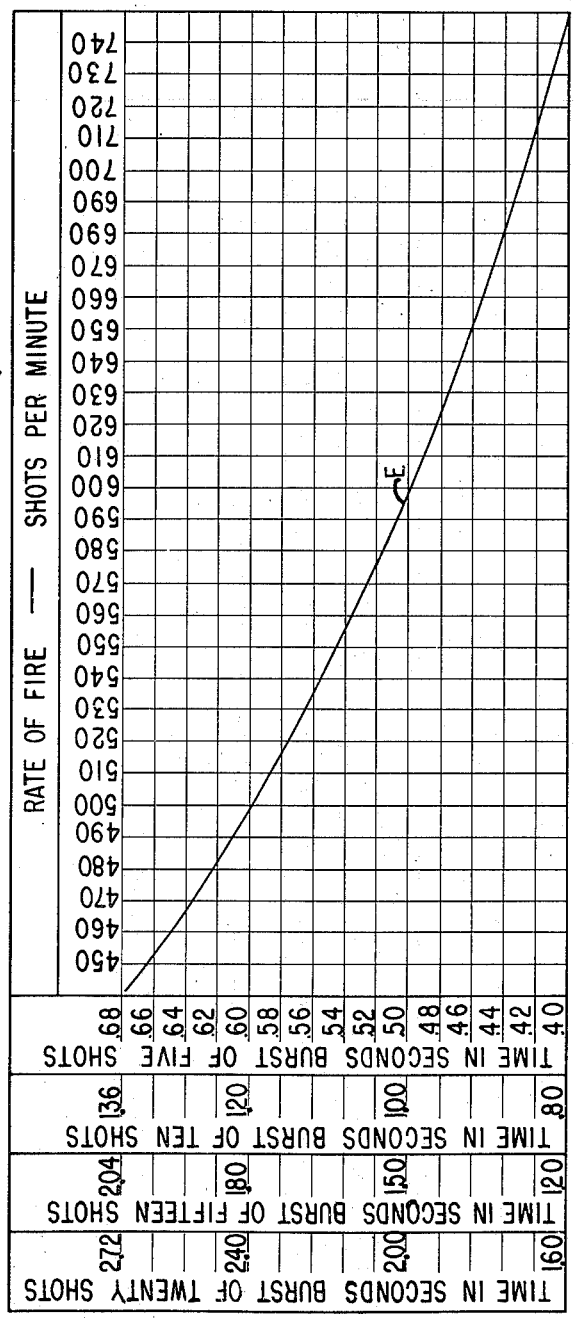

2 each gun tested for the purpose of controlling the apparatus shown in Fig. 1; Fig. 5 illustrates a segment of a typical record produced by the apparatus illustrated in Fig. 1; and Fig. 6 illustrates a chart for rapidly and accurately interpreting the data provided by a record of the character shown in Fig. 5 of the drawings.

Referring now more particularly to Fig. 1 of the drawings, the apparatus there illustrated comprises a recording device 160, which is arranged to be controlled by a photo-electric relay unit 174. This unit, which comprises a photoelectric cell 175, an electronic control device 176, and an electro-magnetic relay R180 is, in turn, arranged to be controlled in accordance with the intensity of a beam of light which is focused on the target of the cell 175 through a converging lens 172 from a light source 171 in the form of an incandescent lamp. The electronic equipment of the device 176 is so controlled that when the beam of light focused on the target of the photoelectric cell 175 is interrupted or broken, the relay R180 is deenergized. On the other hand, when this light beam is not interrupted or obstructed, the resulting increase in energization of the cell 175 causes the electronic equipment of the device 176 to respond by energizing the relay R180. In the physical arrangement of the light source and the photo-electric cell 175, these two elements are so positioned with respect to the gun undergoing test that the light beam is normally obstructed or broken by a flag 173 carried by one of the recoil operated parts of the gun, and is established by the movement of the flag 173 which occurs in response to the recoil action of the gun that accompanies each shot fired from the gun.

The recording device 160 is of the improved construction disclosed and claimed in Patent No. 2,132,808, granted October 11, 1938, to Arthur T. Sigo. In brief, this device comprises a plurality of markers or marking elements 161a, 166a, 167a, 168a and 169a, each including a stylographic pen normally engaging a paper record strip 167. This strip is adapted to be unwound from a winding spool and moved over a driving cylinder at any one of several different and uniform speeds. Each marker has associated therewith an operating magnet, those individual to the five enumerated markers being indicated at 161, 166, 167, 168 and 169, respectively. Each of these magnets, when energized, functions to operate the associated pen to an off-normal position such that an offset line is inscribed on the record strip. For the purpose of rotating the driving cylinder to move the record strip 167 past the markers, a constant speed alternating current motor 158 is provided, which preferably is of the synchronous type. This motor is geared to the driving cylinder by means of a suitable gear mechanism, not shown. Preferably the driving ratio of this gear mechanism is such that the record strip is moved past the marker elements at a constant rate of one inch per second.

Each gun undergoing test is conventionally equipped with a trigger wire which is utilized to govern the mechanical firing mechanism. A solenoid 100 is provided for pulling the trigger wire of a gun undergoing test, thereby to start the firing operation. This solenoid is provided with a movable armature 100a which is shown as being attached to a trigger wire 100b.

In order to correlate the operation of the recording device 160 with the trigger wire solenoid 100, a group of timing relays is provided. This group of relays includes a start relay R120, a timing relay R130 of the well-known pendulum type, and a slow-to-operate start firing relay R140. These relays may be common to one or more guns undergoing test and are arranged to be controlled by firing switches individual to the guns. Thus in the illustrated arrangement the first firing switch 150 is arranged to control the group of timing relays and also the master relay R110 through operation of which the trigger wire solenoid 100 may be energized. A second firing switch 155 is illustrated as having contacts for controlling the master relay and trigger wire solenoid individual to a second gun and for also controlling the group of timing relays.

Current for energizing the synchronous motor 158, the lamp 171 and the various trigger wire solenoids is derived from an alternating current feeder source, the two sides of which are connected to the bracketed terminals 195. More specifically, current for energizing the lamp 171 is supplied to the filament of this lamp through a voltage step-down transformer 170 having its primary winding bridged across the two terminals 195. In order to provide the necessary direct current for energizing the pen magnets of the recording device 160, the master relays individual to the guns undergoing test and the timing relays R120, R130 and R140, a rectifier unit is provided which includes a voltage step-down transformer 190, a full wave copper oxide rectifier 191 and a filter network comprising the series connected iron core choke 194 and the parallel connected condensers 192 and 193.

In Fig. 2 of the drawings there is illustrated a test pit which may be used in testing guns of the type under consideration and is equipped with the improved test apparatus shown in Fig. 1 of the drawings. Briefly considered, this pit is defined by the walls 200a, 200b, 200c and 200d and the floor 200e of a concrete structure 200. At one end of the structure a sand pit is formed between the end wall 200b and a partition 201 which extends between the side walls 200a and 200c. This partition may be of wood or the like and is adapted to carry in the central portion thereof a target 202 formed of armor plate of any desired thickness. The opposite end wall of the structure is provided with a door 203 which is equipped with an observation port 204 having a thick pane 205 of bullet proof glass suitably mounted therein. Within the test pit, and near the forward end thereof, a gun mount 206 is provided which is secured to or formed integral with the floor 200e of the concrete structure 200. This mount is equipped with suitable means for mounting a gun 207 undergoing test so that the muzzle of the gun faces the target 202 and the breech mechanism of the gun faces the door 203.

In one form of a rapid fire gun which may be tested by the above-described apparatus, the gun barrel is provided at its breech end with a short projection 207a of reduced diameter. This part of the gun is utilized for mounting the flag 173. More specifically, and as best shown in Figs. 3 and 4 of the drawings, this flag is formed of flat metal stock and is provided with a portion which is adapted to encircle the projection 207a and to be clamped thereon by means of a clamping bolt 173a. For the purpose of accurately positioning the flag 173 on the gun part 207a, it is provided with a positioning finger 173b which is shaped at its forward edge to conform to the curved contour of the breech end of the gun barrel. With this arrangement the flag 173 may be accurately mounted on the projection 207a of a gun undergoing test by simply telescoping the clamping element of the flag over the projection 207a until the positioning finger 173b engages the surface of the gun barrel, and then tightening the clamping screw 173a until the flag is rigidly secured in position.

In installing the test equipment, the lamp 171 and the converging lens 172 are rigidly mounted on the side wall 200a of the pit structure 200 within a housing structure 208. The photo-electric cell 175 is similarly mounted on the wall 200c of the structure 200 at a point therealong which is directly opposite the lens 172. This cell is mounted within a housing structure 209. In this regard it will be understood that the lamp 171, the lens 172 and the photo-electric cell 175 are so positioned along the walls 200a and 200c that the light beam produced by energization of the lamp 171 is focused by means of the lens 172 directly upon the target of the photo-electric cell 175. More specifically, these elements are so positioned that with a gun 207 rigidly mounted upon the mount 206, and the flag 173 mounted upon the breech end projection 207a of the gun barrel, the trailing edge 173c of the flag just cuts the light beam at substantially the axis of convergence thereof. With this arrangement the photo-electric cell 175 is not normally energized by light produced by the lamp 171. When, however, the gun is fired, the trailing edge 173c of the flag 173 is instantly moved out of the path of the light beam to permit the energization of the photo-electric cell 175 thereby. After the recoil operation of the gun is completed the flag 173 is, of course, restored to its normal position wherein the light beam is again interrupted.

Before considering the operation of the apparatus, and in order to point out how a burst comprising a predetermined number of shots is fired, it is noted that guns of the rapid fire character under consideration are of the self-loading type and are fed from a shell drum or belt. More specifically, a gun of this type is so arranged that the casing of a fired shell is automatically ejected during the recoil movement of the gun barrel and breech mechanism, and a new shell is fed into the firing chamber thereof from the shell drum or belt during the return movement of the barrel and breech mechanism to its normal or firing position.

In order to condition the gun for a firing operation it is necessary manually to insert the first shell in the firing chamber. Moreover, by inserting a dud or dead cartridge in a particular shell receiving opening of the shell drum, or by omitting a shell from the drum or belt at a particular opening thereof, the gun may be present to fire a given number of shells, after which the firing operation is automatically arrested. This method of loading the shell drum or belt is utilized in preconditioning the gun to fire a burst comprising a predetermined number of shells.

In considering the operation of the apparatus, it may be assumed that the alternating current feeder circuit connected to the terminals 195 is energized, whereby the lamp 171 is illuminated to project a beam of light toward the target of the photo-electric cell 175, and current is supplied to the electronic control device 176 and the rectifier unit. It will be noted that when the alternating current feeder circuit is energized, circuits are provided for energizing the two relays R130 and R140. More specifically, the circuit for energizing the relay R130 extends from the positive output terminal 196 of the rectifier, by way of the contacts 121 and the winding of R130 to the negative output terminal 197 of the rectifier. With this relay operated, the circuit for energizing the slow-acting timing relay R140 extends from the positive rectifier terminal 196 by way of the contacts 132 and 131 and the winding of R140 to the negative rectifier terminal 197. It may be assumed further that the gun which is set up for test is equipped with a trigger wire 109b which is connected to the armature of the solenoid 100.

With the apparatus in the condition described above, and the gun fully conditioned to fire a trial burst comprising a predetermined number of shots, the test may be initiated by operating the firing switch 150 from the illustrated normal position thereof to its off-normal position wherein the contacts 151 and 152 are respectively engaged. At the contacts 151, a circuit is prepared for energizing the master relay R110 individual to the gun 207. At the contacts 152, a circuit is completed for energizing the start relay R120, this circuit extending from the positive rectifier terminal 196 by way of the contacts 152 and 143 and the winding of R120 to the negative rectifier terminal 197. In operating, the relay R120 closes its contacts 122 to complete an obvious locking circuit for itself, and opens its contacts 121 to deenergize the winding of the timing relay R130. At its contacts 124, the relay R120 opens a point in one of the available circuits for energizing the driving motor 158 of the recording device 160. At its contacts 123, the relay R120 completes an obvious alternative circuit for energizing this motor. When thus energized the motor 158 initiates the movement of the record strip 167 past the writing points of the several markers, whereby spaced-apart and parallel lines are inscribed upon the record sheet by the stylographic pens of these markers. After the starting period of the motor 158 is completed and all slack is taken up in the gear train connecting the rotor of the motor with the driving drum of the recorder, the record strip 167 is driven past the markers at a substantially constant rate of one inch per second.

When the relay R130 is deenergized in the manner just explained, its weighted armature 134 is released and starts to vibrate between two extreme positions, wherein the contacts 132 and 133 are alternately closed thereby. Incident to the vibration of this armature, the winding of the start firing relay R140 is alternately closed through the contacts 132 and 133. So long as the amplitude of vibration of the armature 134 is sufficient alternately to close the contacts 132 and 133, the relay R140, due to its slow-acting characteristic, remains operated. When, however, the amplitude of vibration of this armature is sufficiently reduced that the contacts 132 and 133 are no longer closed, the relay R140 is deenergized and restores. In releasing, this relay opens its contacts 142 to interrupt its locking circuit and, at its contacts 143, opens a point in the initially completed operating circuit for the relay R120. At its contacts 144, the relay R140 prepares an alternative circuit for energizing the motor 158. At its contacts 141, the relay R140 completes a circuit through the firing switch contacts 151 for energizing the master relay R110.

In operating, the relay R110 closes its contacts 111 and 112 to supply current to the winding of the trigger wire solenoid 100. When this solenoid is thus energized it pulls the trigger wire 109b, thereby to cause the gun 207 to fire at its maximum firing speed the shells which have been inserted in the shell drum of the gun. Thus if this drum has been loaded with sixteen shells, for example, a burst of sixteen shots will be fired by the gun 207 as fast as the gun is capable of operating. Incident to the recoil accompanying each shot, the flag 173 is moved out of the path of the beam of light focused on the target of the photo-electric cell 175 by the lens 172. As the gun automatically recovers from its recoil operation the flag 173 is again moved to interrupt the light beam.

Each time the light beam strikes the target of the photo-electric cell 175, a control pulse is transmitted to the electronic control device 176. This device, in responding to the control pulse, functions to energize the fast-acting relay R180. In operating, the relay R180 closes its contacts 181 to complete an obvious circuit for energizing the parallel connected pen operating magnets 166, 167, 168 and 169. These magnets, in operating, attract their associated pen operating armatures such that the writing points of the marking elements 166a, 167a, 168a and 169a are simultaneously actuated to a position wherein offset lines are traced thereby on the record strip 167.

Incident to the recovery of the gun 207 from the recoil accompanying each shot, and the consequent decrease in the energization of the photo-electric cell 175, the control device 176 functions to deenergize the relay R180. This relay, in releasing, opens its contacts 181 to deenergize the parallel connected pen operating magnets 166, 167, 168 and 169. These magnets, in releasing their respectively associated pen operating armatures, permit the marking elements 166a, 167a, 168a and 169a to be restored to normal, wherein the pens are positioned to continue their normal tracing paths. From the above explanation it will be understood that as the shots of the given burst are successively fired, the parallel connected pen operating magnets are repeatedly operated to cause a succession of offset lines to be traced on the record strip 167. The length of each offset line indicates the time duration of the corresponding recoil and recovery period of the gun. More specifically, the total time interval elapsing during the firing of the given burst, as measured by the lengths of the line segments in which the offset tracings appear, provide an accurate indication of the total time interval required for the burst. After all of the shots of the burst, as determined by the loading of the shell drum, have been fired, the firing of the gun is automatically discontinued. The test operator, upon observing that the burst has been completed, may release the firing switch 150, permitting this switch to be restored to normal. As this switch releases, the contacts 151 are opened to deenergize the master relay R110 and the contacts 152 are disengaged to deenergize the start relay R120. The relay R110, upon restoring, opens its contacts 111 and 112 to interrupt the circuit for supplying current to the winding of the trigger wire solenoid 100. The relay R120, upon restoring, opens its contacts 122 further to interrupt its own locking circuit and, at its contacts 124, completes a circuit through the contacts 144 for maintaining the motor 158 energized. At its contacts 123, the relay R120 opens the initially completed circuit for energizing this motor. At its contacts 121, the relay R120 recompletes the operating circuit for the timing relay R130. In operating, the relay R130 closes its contacts 131 and 132 to recomplete the operating circuit for the start firing relay R140. The latter relay, upon operating, opens its contacts 144 to deenergize the driving motor 158 and thus arrest the movement of the record strip 167 past the pen points of the magnet controlled markers. At its contacts 143, the relay R140 reprepares the operating circuit for the start relay R120. At its contacts 142, the relay R140 recompletes the locking circuit for itself. At its contacts 141, the relay R140 opens another point in the operating circuit for the master relay R110. Following the reoperation of the relay R140 the equipment is conditioned for use in recording the performance of the gun set up for test, during the firing of another burst.

It will be noted from the above explanation that the timing equipment, comprising the three relays R120, R130 and R140 and the recording device 160, may be common to a number of guns set up for test and may be used during different periods to test any one of the several guns. To this end, additional firing switches are provided for individually controlling the master relays of the several guns. The manner in which these master relays are controlled by the timing relays will be clearly apparent from the above explanation and the illustrated circuit wiring arrangement.

As indicated above, in Fig. 5 of the drawings there is illustrated a typical record of the performance of a gun from which bursts comprising different numbers of shots, are fired. More specifically, the offset lines under the bracket A represent a burst of six shots, the offset lines under the bracket B represent a burst of eleven shots, the offset lines under the bracket C represent a burst of sixteen shots, and the offset lines under the bracket D represent a burst of twenty-one shots. In this regard it is noted that the record strip is ruled at intervals of one-tenth of an inch, so that the spacing between adjacent rulings represents a time interval of one-tenth of a second. It is noted further that the end of each firing interval is always measured to the point where the record of the next succeeding shot starts on the record. Thus to time bursts of five, ten, fifteen and twenty shots, respectively, six, eleven, sixteen and twenty-one shot bursts must be fired. With the above explanation in mind, it will be observed from a more specific consideration of the offset lines under the bracket C that 1.52 seconds were required to fire a burst of fifteen shots from the gun on which the recorded data was obtained.

For the purpose of rapidly ascertaining the rate of fire from this figure and other observed figures, the graph illustrated in Fig. 6 of the drawings may be used. In this graph different observed time intervals for bursts of five, ten, fifteen and twenty shots, respectively, are plotted against the corresponding rate of fire in shots per minute, the exponential curve E extending from the upper left-hand corner of the graph to the lower right-hand corner thereof being mathematically calculated to provide a conversion line which may be used to convert the observed time interval for different bursts to rate of fire in shots per minute. Thus in the illustrative case considered above, wherein 1.52 seconds is the recorded time interval for firing a burst of fifteen shots from a particular gun undergoing test, the observed firing rate is of the order of 593 shots per minute. This figure is obtained by horizontally projecting the 1.52 figure for a burst of fifteen shots until it intersects the conversion line, and by vertically projecting the point of intersection to the horizontally extending shots per minute scale from which the reading is taken.

The purpose of simultaneously operating a plurality of the markers during the firing of a test burst is that of producing in one operation a plurality of original records. After the duplicate records are thus obtained, the record strip may be cut lengthwise to separate the records, and one original record, with the serial number of the tested gun thereon, may then be transmitted to each interested person, department or agency as the case may be.

While one embodiment of the invention has been disclosed, it will be understood that various modifications may be made therein which are within the true spirit and scope of the invention.

What is claimed is:

1. In apparatus for determining the firing speed of a rapid fire gun which carries a recoil operated part, means for initiating the firing of said gun, recording means, means for starting said recording means, means for delaying the operation of said fire initiating means for a predetermined time interval after the initiation of operation of said means for starting said recording means, and photo-electric means controlled in accordance with the operation of said part for controlling said recording means to make a permanent record of the elapsed time interval during which a given burst is fired by said gun.

2. In apparatus for determining the firing speed of a rapid fire gun which carries a recoil operated part, means for initiating operation of said gun, recording means comprising a record strip, a marker bearing on said strip and means for moving said record strip past said marker at a substantially constant speed, means for initiating movement of said record strip prior to actuation of said means for initiating operation of said gun, and photo-electric means controlled in accordance with the operation of said part for causing said marker to trace an offset line on said record strip for the duration of each recoil period of said gun.

3. In apparatus for determining the firing speed of a rapid fire gun which carries a recoil operated part, recording means comprising a record strip, a plurality of markers bearing on said record strip at spaced intervals and means for moving said record strip past said markers at a substantially constant speed such that substantially parallel lines are traced on said strip by said markers, means for initiating movement of said record strip and subsequently initiating firing of said gun, and photo-electric means controlled in accordance with the operation of said part for causing said markers simultaneously to trace offset lines on said record strip for the duration of each recoil period of said gun.

4. In apparatus for determining the firing speed of a rapid fire gun which carries a recoil operated part, recording means comprising a record strip, a marker bearing on said record strip, and means including a constant speed motor for moving said record strip past said marker at a substantially constant speed, a firing switch, means responsive to the operation of said switch for energizing said motor to initiate movement of said record strip, means also responsive to operation of said firing switch for causing said gun to fire a given burst, and photo-electric means controlled in accordance with the operation of said part for causing said marker to trace an offset line on said record strip for the duration of each recoil period of said gun.

5. In apparatus for determining the firing speed of a rapid fire gun which carries a recoil operated part, recording means comprising a record strip, a marker bearing on said record strip and means including a constant speed motor for moving said record strip past said marker at a substantially constant speed, a firing switch, means responsive to the operation of said switch for energizing said motor to initiate movement of said record strip, means also responsive to operation of said firing switch for causing said gun to fire a given burst, said last-named means including a device for delaying the start of said burst until said motor is operating at full speed, and photo-electric means controlled in accordance with the operation of said part for causing said marker to trace an offset line on said record strip for the duration of each recoil period of said gun.

6. In apparatus for determining the firing speed of a rapid fire gun which carries a recoil operated part, recording means comprising a record strip, a plurality of markers bearing on said record strip at spaced intervals and means including a constant speed motor for moving said record strip at a substantially constant speed such that substantially parallel lines are traced on said record strip by said markers, a firing switch, means responsive to the operation of said firing switch for energizing said motor to initiate movement of said record strip, means also responsive to operation of said firing switch for causing said guns to fire a given burst, and photo-electric means controlled in accordance with the operation of said part for causing said markers simultaneously to trace offset lines on said record strip for the duration of each recoil period of said gun.

7. In apparatus for determining the firing speed of a rapid fire gun which carries a recoil operated part, recording means comprising a record strip, a plurality of markers bearing on said record strip at spaced intervals and means including a constant speed motor for moving said record strip at a substantially constant speed such that substantially parallel lines are traced on said record strip by said markers, a firing switch, means responsive to the operation of said firing switch for energizing said motor to initiate movement of said record strip, means also responsive to operation of said firing switch for causing said guns to fire a given burst, said last-named means including a device for delaying the start of said burst until said motor is operating at full speed, and photo-electric means controlled in accordance with the operation of said part for causing said markers simultaneously to trace offset lines on said record strip for the duration of each recoil period of said gun.

8. In apparatus for determining the firing speed of a rapid fire gun which carries a recoil operated part, recording means comprising a record strip, a marker bearing on said record strip and means including a constant speed motor for moving said record strip past said marker at a substantially constant speed, a firing switch, means responsive to the operation of said switch for energizing said motor to initiate movement of said record strip, means also responsive to operation of said firing switch for causing said gun to fire a given burst, and photoelectric means controlled in accordance with the operation of said part to produce an indication on said record strip of the time interval required by said gun to fire said given burst.

9. In apparatus for determining the firing speed of a rapid fire gun which carries a recoil operated part, recording means comprising a record strip, a marker bearing on said record strip and means including a constant speed motor for moving said record strip past said marker at a substantially constant speed, a firing switch, means responsive to the operation of said switch for energizing said motor to initiate movement of said record strip, means also responsive to operation of said firing switch for causing said gun to fire a given burst, said last-named means including a device for delaying the start of said burst until said motor is operating at full speed, and photo-electric means controlled in accordance with the operation of said part to produce an indication on said record strip of the time interval required by said gun to fire said given burst.

RALPH R. FOWLER.

REFERENCES CITED

The following references are of record in the file of this patent:

UNITED STATES PATENTS

| Number | Name | Date |
| --- | --- | --- |
| 2,152,947 | Blomerius | Apr. 4, 1939 |
| 1,444,886 | Rounds | Feb. 13, 1923 |
| 2,077,390 | Blau | Apr. 20, 1937 |